United States Patent
Farkas et al.

(10) Patent No.: US 8,867,409 B2
(45) Date of Patent: Oct. 21, 2014

(54) MULTIPLE TREE REGISTRATION PROTOCOL

(75) Inventors: János Farkas, Kecskemét (HU); Csaba Antal, Kiskunlacháza (HU); Attila Takács, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 693 days.

(21) Appl. No.: 13/054,430

(22) PCT Filed: Nov. 15, 2008

(86) PCT No.: PCT/IB2008/003889
§ 371 (c)(1),
(2), (4) Date: Jan. 14, 2011

(87) PCT Pub. No.: WO2010/007467
PCT Pub. Date: Jan. 21, 2010

(65) Prior Publication Data
US 2011/0116418 A1    May 19, 2011

Related U.S. Application Data

(60) Provisional application No. 61/134,886, filed on Jul. 14, 2008.

(51) Int. Cl.
*H04L 12/28* (2006.01)
*H04L 12/751* (2013.01)
*H04L 12/721* (2013.01)
*H04L 12/753* (2013.01)
*H04L 12/46* (2006.01)

(52) U.S. Cl.
CPC ............. *H04L 45/48* (2013.01); *H04L 45/02* (2013.01); *H04L 45/66* (2013.01); *H04L 12/462* (2013.01); *H04L 12/4641* (2013.01)
USPC ........................................................ 370/256

(58) Field of Classification Search
USPC .......... 370/225, 229, 256, 352, 392, 401, 400
See application file for complete search history.

(56) References Cited

U.S. PATENT DOCUMENTS

| | | | | |
|---|---|---|---|---|
| 7,760,668 | B1 * | 7/2010 | Zinjuvadia | 370/256 |
| 8,144,577 | B2 * | 3/2012 | Finn | 370/229 |
| 2007/0263554 | A1 * | 11/2007 | Finn | 370/256 |
| 2007/0263640 | A1 * | 11/2007 | Finn | 370/401 |
| 2008/0310430 | A1 * | 12/2008 | He | 370/400 |
| 2009/0003313 | A1 * | 1/2009 | Busch et al. | 370/352 |
| 2009/0109843 | A1 * | 4/2009 | Yang | 370/225 |

OTHER PUBLICATIONS

International Search Report and Written Opinion (mailed Jul. 31, 2009).

(Continued)

*Primary Examiner* — Hassan Phillips
*Assistant Examiner* — Ajay Cattungal
(74) *Attorney, Agent, or Firm* — Patent Portfolio Builders PLLC

(57) ABSTRACT

A registration protocol for setting up and updating a tree that defines the active topology in an Ethernet network includes a plurality of application components and a plurality of attribute declaration components corresponding to the application components, wherein the application components declare and register attribute values and the corresponding attribute declaration components make and withdraw registration of the attributes.

20 Claims, 2 Drawing Sheets

(56) References Cited

OTHER PUBLICATIONS

International Preliminary Report on Patentability (completed Oct. 9, 2010).

IEEE Standard for Local and Metropolitan Area Networks—Virtual Bridged Local Area Networks—Amendment 7: Multiple Registration Protocol.

* cited by examiner

MULTIPLE TREE REGISTRATION PROTOCOL

PRIORITY APPLICATION

This application claims priority from U.S. Provisional Application No. 61/134,886 filed on Jul. 14, 2008, the subject matter of which is incorporated in its entirety herein by reference.

TECHNICAL FIELD

The present invention relates to Ethernet networks and more particularly, to providing a loop free topology within these networks.

BACKGROUND

Ethernet forwarding depends on a loop free active topology since looped frames cause network errors especially if the looped frames are multiplied during transmission such as in multicast and broadcast frames. The active topology is configured by Rapid Spanning Tree Protocol (RSTP) or Multiple Spanning Tree Protocol (MSTP) in current Ethernet networks. Extensions are being defined for Ethernet as it is becoming more popular in network segments (besides LANs) such as in metro core and backbone networks. As a result of the increased popularity, a need exists for defining mechanisms (other than MSTP) for configuring the active topology.

There are currently two tracks under development within IEEE 802.1aq that are aimed at replacing MSTP with Intermediate System to Intermediate System (IS-IS) link-state protocol.

In one track, IS-IS is used for the control of the bridge network where traditional MAC learning is applied (i.e. a bridge learns the reachability of a MAC address if it sees an Ethernet frame sent from that MAC address that may be applied in an enterprise or in a campus network where MAC addresses are unmanaged for example). This track is referred to as Shortest Path Bridging (SPB).

In the other track, IS-IS is applied in a Provider Backbone Bridge (PBB) Network where all addresses are managed and unknown addresses do not appear in the network. In such an environment, no spanning tree protocol is applied but Filtering Databases (FDBs) are set up and updated directly by the IS-IS control protocol. This track is referred to as Shortest Path Backbone Bridging (SPBB).

Accidental loops may appear due to the unsynchronized update of FDBs by a link-state control protocol such as IS-IS during a topology transient (i.e. changing topology). While ingress filtering mechanism can be applied to eliminate loop of unicast traffic, it is not suitable for eliminating all possible loops of multicast traffic. What is desired, therefore, is a mechanism for preventing loops in multicast traffic.

The Mutiple Registration Protocol (MRP) under IEEE 802.1ak enables participants (i.e. network nodes intending to participate in a specific service such as in a VLAN or in a multicast tree) in a MRP application to register attributes with other participants in a Bridged Local Area Network (BLAN). This means that an MRP application is defined for a specific service and bridges and bridge ports that aim to participate in that specific service are able to register through this MRP application.

Two Applications are defined for registering virtual LANs (VLANs) and group MAC addresses. These applications are: (1) Multiple VLAN Registration Protocol (MVRP) where bridges can register to a VLAN and the aim is to provide automatic configuration of VLANs instead of manual configuration; (2) Multiple MAC registration protocol (MMRP) which provides automatic registration of MAC addresses to a multicast service. MRP is a standard protocol for controlling the forwarding over the active topology.

IEEE does not provide an alternative mechanism to MSTP for the configuration of the active topologies (i.e. for setting up and updating spanning trees). IS-IS is proposed as a control protocol for the configuration of spanning trees within SPB. However, the loop prevention mechanisms under discussion have significant drawbacks. Reverse Forwarding Path Check, which is an ingress checking mechanism, is proposed for SPBB. Accidental loops may appear during a topology transient from where multicast frames may propagate to the rest of the network (also referred to as Catherine-wheel) which causes multiple reception of the same or identical frames at the destination thus degrading the quality in a real-time application.

While some sequences are proposed for setting up loop free active topologies, the protocols applied there do not include MRP which is a suitable IEEE standard in order to set up trees.

SUMMARY

In an exemplary embodiment, a registration protocol for setting up and updating a tree in a network is disclosed. The protocol comprises a plurality of application components with each component corresponding to a participant. The protocol also comprises a plurality of attribute declaration components corresponding to the application components. The application components are adapted to declare and register attribute values. The corresponding attribute declaration components are adapted to make and withdraw registration of the attributes. The tree is defined to make an active topology in an Ethernet network.

In another embodiment, a method of setting up and updating a tree in a network is disclosed. In a first step, a declaration of a tree and a reception of the declaration are determined. The declarations include attributes for setting up the tree. Then, ingress checking is updated and ports that are to be modified are identified. The identified ports are modified and the declaration along the tree is propagated wherein the tree defines an active topology in an Ethernet network.

In a further embodiment, a multi port bridge is disclosed. The multi port bridge comprises a multiple tree registration protocol (MTRP) application for MTRP participants wherein the application sets up and updates a tree in a network. The application comprises a plurality of application components with each component corresponding to a participant. The application also comprises a plurality of attribute declaration components corresponding to the application components, wherein the application components declare and register attribute values and the corresponding attribute declaration components make and withdraw registration of the attributes, wherein the tree defines an active topology in an Ethernet network The method disclosed in exemplary embodiments defines an extension to the IEEE 802.1ak Multiple Registration Protocol, which is widely deployed in Ethernet networks. Thus, the disclosed method provides a new easily implementable tool for controlling of forwarding trees in Ethernet networks.

BRIEF DESCRIPTION OF THE DRAWINGS

The various features, advantages, and objects of this invention will be understood by reading this description in conjunction with the drawings, in which.

DETAILED DESCRIPTION

Figure 1:
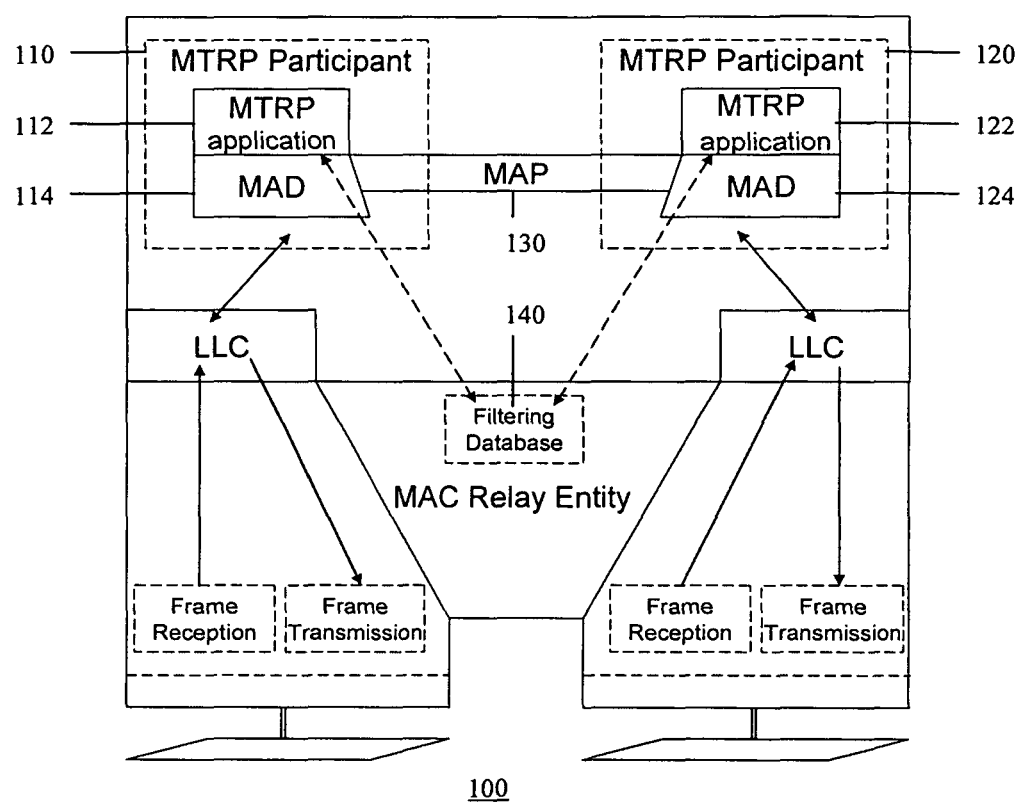
FIG. 1 illustrates an architecture in accordance with exemplary embodiments.

The following description of the implementations consistent with the present invention refers to the accompanying drawings. The same reference numbers in different drawings identify the same or similar elements. The following detailed description does not limit the invention. Instead, the scope of the invention is defined by the appended claims.

MRP is utilized to form reachability trees. Therefore, MRP is a good candidate for forming the spanning trees needed in SPB. Current MRP applications (i.e. MMRP and MVRP) operate on the active topology that is determined by a spanning tree topology. In contrast, according to exemplary embodiments, MRP can be used to form the active topology within SPB where a link-state protocol may be applied to collect topology information (i.e. MRP itself can be used to form the active topology and therefore, MRP has a greater role in forming the active topology). A new MRP application, referred to herein as Multiple Tree Registration Protocol (MTRP), is disclosed according to exemplary embodiments. MTRP may set (form the active topology) and update the active topology for SPB or SPBB (i.e. the source rooted spanning trees). Trees may be set and configured according to known methods.

MRP is a standard protocol that is suitable for forming and maintaining reachability trees in bridged networks. As highlighted above, two applications of MRP are already defined in IEEE P802.1ak/D8.0. These are: Multiple MAC Registration Protocol (MMRP) and Multiple VLAN Registration Protocol (MVRP).

MRP forms a reachability tree by the declaration of attributes in a participant of a given MRP application and the registration to those attributes in other MRP participants. That is, since each bridge port has its own participant, the participant of each bridge port that has to be included in the reachability tree registers to a specific attribute. For example, a multicast tree for a video stream can be formed by the declaration of an attribute corresponding to the service and the presence or absence of the registration indicates whether or not to send a data. Thus, a sub-tree may be formed over the active topology.

Each MRP application operates over an MRP Attribute Registration Context (MAP Context) which defines the set of applicable bridge ports that form the applicable active topology. IEEE 802.1ak defines two MAP Contexts for the defined MRP applications. They are Base Spanning Tree Context (MAP Context 0) and VLAN Context. In the former (i.e. Base Spanning Tree Context), the active topology may be formed by the operation of Rapid Spanning Tree Protocol (RSTP). In the latter (i.e. VLAN Context), the active topology may be formed by the subset of bridge ports and the underlying Spanning Tree that support a given VLAN.

MRP Attribute Propagation (MAP) is responsible for the propagation of attributes registered on bridge ports (The active or non-blocked bridge ports provide a shortest path towards the root bridge and the registered ports can be a subset of these active parts in MMRP or in MVRP) across the network to other participants. The applied MAP Context determines the propagation of the attributes as they can only be propagated within the context.

MRP applications use MR Protocol Data Units (MRPDU) for the communication between different participants. Each MRP application has its own EtherType: MMRP: 88-F6 and MVRP: 88-F5. Each MRP application also has its own destination address: MMRP: 01-80-C2-00-00-20 and MVRP: 01-80-C2-00-00-21. MMRP uses Multiple MAC registration protocol data units (MMRPDUs) and MVRP uses Mutiple VLAN registration protocol data units (MVRPDUs).

According to exemplary embodiments, a new MRP application may be defined. The new MRP may be referred to as Multiple Tree Registration Protocol (MTRP) for the control of the active topology in such environments where the active topology is not controlled by any spanning tree protocol. The active topology may be formed either by controlling port states and roles similar to MSTP or controlling static filtering entries in the filtering database as is the case in a PBB-TE environment.

A new MAP Context may be defined for MTRP. As MTRP controls the active topology, a dynamic MAP Context may be defined for MTRP. The dynamic MAP Context may be referred to as Dynamic Tree Context. For any new MRP application, a new EtherType and a new destination address have to be defined.

A new type of MRPDU may also be defined for the new type of MRP application (i.e. MTRP), which may be referred to as Multiple Tree Registration Protocol Data Unit (MTR-PDU). A MTRPDU contains the description of the whole tree that the MRP application aims to configure. Existing tree description formats may be used.

A MTRP application or architecture 100 for MTRP participants in a two-port bridge in accordance with exemplary embodiments is illustrated in FIG. 1. MTRP 100 may fit into a MRP architecture as a new application. MTRP 100 may include two MTRP participants 110 and 120 (although more than two participants can also be included). MTRP participant 110 may include a MTRP application component 112 and a MRP Attribute Declaration (MAD) component 114. Similarly, MTRP participant 120 may include a MTRP application component 122 and a MRP Attribute Declaration (MAD) component 124. MTRP 100 operates in a manner similar to a MRP application except in the operation of the MRP Attribute Propagation (MAP) as described further below.

MTRP application component 112 may declare and register attribute values (for the port it resides in). The attribute values may include identifier of the tree (such as a VLAN ID for example) or the source MAC address (i.e. ID of the root of the tree). MTRP application component 112 may also control propagation of the declaration of a tree via the MAP (such as via MAP 130 for example). MTRP may utilize two primitives defined for MRP to request the MAD component (such as MAD 114) to make or withdraw attribute registrations.

The primitive for making the attribute registration may be represented by MAD_Join.request (attribute_type, attribute_vlue, new) and the primitive for withdrawing the attribute registration may be represented by MAD_Leave.request (attribute_type, attribute_vlue). The attribute_type may be the MTRP_type for MTRP and attribute_value may be the ID of the tree.

A MAD component (such as MAD component 114) may generate MTRP messages (containing the declaration of a tree) for transmission and processes MTRP messages received from other participants (such as from participant 120 in this example).

MAP function 130 may propagate the attributes. In a generic MRP application, the propagation of attributes is determined by the context which is by the active topology or its subset (e.g. VLAN). In MTRP according to exemplary embodiments, the propagation may be determined by MTRP application component 112 since the MTRP application component itself determines the active topology. MTRP application component 112 controls the dynamic tree context; that is, the set of bridge ports which are part of the tree under configuration may be included in the dynamic tree context.

A tree may be set up and maintained by updates by a MTRP protocol according to exemplary embodiments (the tree may result from a known traffic engineering method including a tree computation algorithm such as the Dijkstra method for example). The tree may be a spanning tree or a shortest path tree for shortest path bridging (SPB). The tree may be identified by a VLAN ID or by the ID of its root bridge (e.g. its MAC address). A preferred order of updates is from the root bridge towards leaf bridges (i.e. those bridges that are connected to the rest of the tree by only a single connection).

The tree may be set either by port states (i.e. state of the ports) or by a filtering database (FDB). FDB or ports may thus be adjusted by MTRP. All ports included in the declaration of registration may become part of the tree. Ingress filtering (by reverse path forward checking, RPFC, for example) may be utilized for loop prevention if the active topology is defined by the FDB which may also be set by MTRP. Ingress traffic on the tree should only be enabled on the same port on which the declaration MTRPDU of that tree arrived at the bridge.

A network entity that initiates the setup of the tree or updates the tree needs knowledge of the physical topology of the tree. Such topology information may be obtained by a link state protocol for example. The entity may be the root bridge of a tree or a central management entity for the entire network.

Declaration of the tree may take place in the root bridge of the tree (i.e. attribute declaration). This declaration may then be propagated by the MAP on each port of the root bridge that is part of the tree. The declaration(s) may arrive at the neighboring bridges and register the port on which they arrived. The declaration may then be propagated along the tree that is being configured which is described in the MTRPDU and registrations may take place according to the MTRPDU. While the tree is being updated, both registration and deregistration of ports may take place. Concurrent with the registration, the ingress filtering may also be set up. Registrations and declarations have an effect either on the filtering database or on the port roles based on the realization of the tree.

Figure 2:
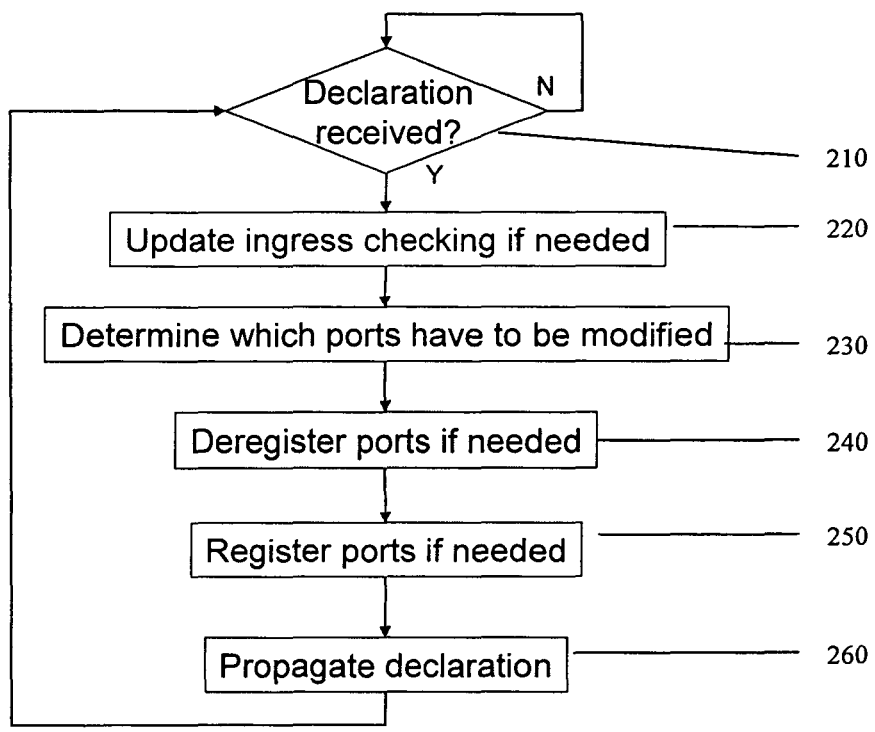
FIG. 2 illustrates a method utilizing an application according to exemplary embodiments.

An exemplary method or process 200 utilizing the MTRP application for setting and updating a tree is illustrated in FIG. 2. The first declaration of a tree may be made at the root bridge (declaration of the tree includes the description and advertisement of the tree). In the other bridges (i.e. at bridges other than the root bridge), a determination may be made (210) as to whether a declaration of a tree has been received. If the declaration has not been received, then the process 200 may query for the reception of the declaration repeatedly. If the declaration has been received, the ingress checking may be updated (220) if necessary (for loop mitigation). A determination may be made to identify the ports that are to be modified (230). Based on the determination made at 230, ports may either be deregistered (or, blocked) (240) or be registered (250) as needed. The declaration may then be propagated along the tree (260).

A registration service and the extended filtering service may depend on the identification applied for the trees. If VLAN IDs are used, then the procedures corresponding to MVRP can be applied. Standard procedures defined in IEEE 802.1 ak may be used. For example, for registration, ES_REGISTER_VLAN_MEMBER (VID) may be used and for deregistration, ES_DEREGISTER_VLAN_MEMBER (VID) may be used.

If MAC addresses of the root bridge is the identifier, then the procedures corresponding to MMRP may be applied. These may be represented by REGISTER_MAC_ADDRESS (MAC_ADDRESS) and DEREGISTER_MAC_ADDRESS (MAC_ADDRESS).

As a result of invoking registrations and deregistrations in the network, the active topologies are set. Registrations are controlled by the MTRP application rather than a higher layer application.

It is expected that this invention can be implemented in a wide variety of environments. It will also be appreciated that procedures described above may be carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

It is emphasized that the terms "comprises" and "comprising", when used in this application, specify the presence of stated features, integers, steps, or components and do not preclude the presence or addition of one or more other features, integers, steps, components, or groups thereof.

Thus, this invention may be embodied in many different forms, not all of which are described above, and all such forms are contemplated to be within the scope of the invention. The particular embodiments described above are merely illustrative and should not be considered restrictive in any way. The scope of the invention is determined by the following claims, and all variations and equivalents that fall within the range of the claims are intended to be embraced therein.

APPENDIX I

List of abbreviations and acronyms used in the description:
BPDU Bridge Protocol Data Unit
FDB Filtering DataBase
IS-IS Intermediate System to Intermediate System
LSA Link State Advertisement
LSP Link State Protocol data unit
MRP Multiple Registration Protocol
MMRP Multiple MAC Registration Protocol
MMRPDU Multiple MAC Registration Protocol Data Unit
MTRPDU Multiple Tree Registration Protocol Data Unit
MVRP Multiple VLAN Registration Protocol
MVRPDU Multiple VLAN Registration Protocol Data Unit
MSTP Multiple Spanning Tree Protocol
PBB-TE Provider Backbone Bridges—Traffic Engineering
RSTP Rapid Spanning Tree Protocol
SPB Shortest Path Bridging

The invention claimed is:

1. A method for registering a tree in a network having interconnected multi port bridges, comprising the steps of:
   defining a plurality of application components, each component corresponding to a participant;
   defining a plurality of attribute declaration components corresponding to the application components;
   declaring and registering attribute values by the application components;
   making and withdrawing attribute values by the corresponding attribute declaration components; and
   controlling, by one of the plurality of application components, a dynamic tree context, the dynamic tree context defining a set of bridge ports of the interconnected multi-port bridges that are part of the tree wherein the tree defines an active topology in an Ethernet network and the one of the plurality of application components uses a multiple registration protocol data unit (MRPDU) for communication between the participants and the MRPDU contains a description of the whole tree.

2. The method of claim 1, wherein the attributes are declared at a root bridge of the tree.

3. The method of claim 1, wherein the attribute values comprise an identifier of the tree being configured within the network.

4. The method of claim 3, wherein the identifier is a VLAN ID.

5. The method of claim 1, wherein the one of the plurality of application components controls propagation of the declaration.

6. The method of claim 5, wherein the control of the propagation is via an attribute propagation component.

7. The method of claim 6, wherein the propagation component propagates the declaration on each port of a root bridge of the tree.

8. The method of claim 1, wherein a request to the declaration component for making and withdrawing of the registration is via primitives defined for the protocol.

9. The method of claim 1, wherein the declaration component generates messages for transmission and processes messages received from other participants.

10. The method of claim 1, wherein the tree is one resulting from a traffic engineering method.

11. The method of claim 10, wherein the tree is a shortest path tree.

12. The method of claim 1, wherein the tree is updated starting with the root bridge and propagating toward leaf bridges.

13. The method of claim 1, wherein the tree is set up by a filtering data base.

14. The method of claim 13, wherein ingress filtering is used for loop mitigation.

15. The method of claim 1, wherein the tree is set up by a plurality of port states.

16. The method of claim 1, wherein a network entity initiates the setup and updating of the tree, the entity having knowledge of a physical topology of the tree.

17. The method of claim 16, wherein topology information is obtained by a link state protocol.

18. The method of claim 16, wherein the network entity is a root bridge of the tree.

19. The method of claim 1, wherein the attribute values comprise a MAC address of a root of the tree being configured within the network.

20. A multi port bridge in a network for determining a declaration of a tree, the declaration including attributes for setting up a tree wherein the tree defines an active topology in an Ethernet network, the bridge comprising:
    a plurality of application components, each component corresponding to a participant; and
    a plurality of attribute declaration components corresponding to the application components, wherein:
        the application components are adapted to declare and register attribute values; and
        the corresponding attribute declaration components are adapted to make and withdraw registration of the attributes wherein
    one of the plurality of application components:
        controls a dynamic tree context, the dynamic tree context defining a set of bridge ports of interconnected multi-port bridges that are part of the tree; and
        uses a multiple registration protocol data unit (MRPDU) for communication between the participants and the MRPDU includes a description of the whole tree.

* * * * *